April 18, 1967 W. S. PEPPLER 3,314,212
TRAY LOADING MACHINE
Filed Feb. 17, 1965 4 Sheets-Sheet 1

INVENTOR
William S. Peppler
BY
KARL W. FLOCKS
ATTORNEY

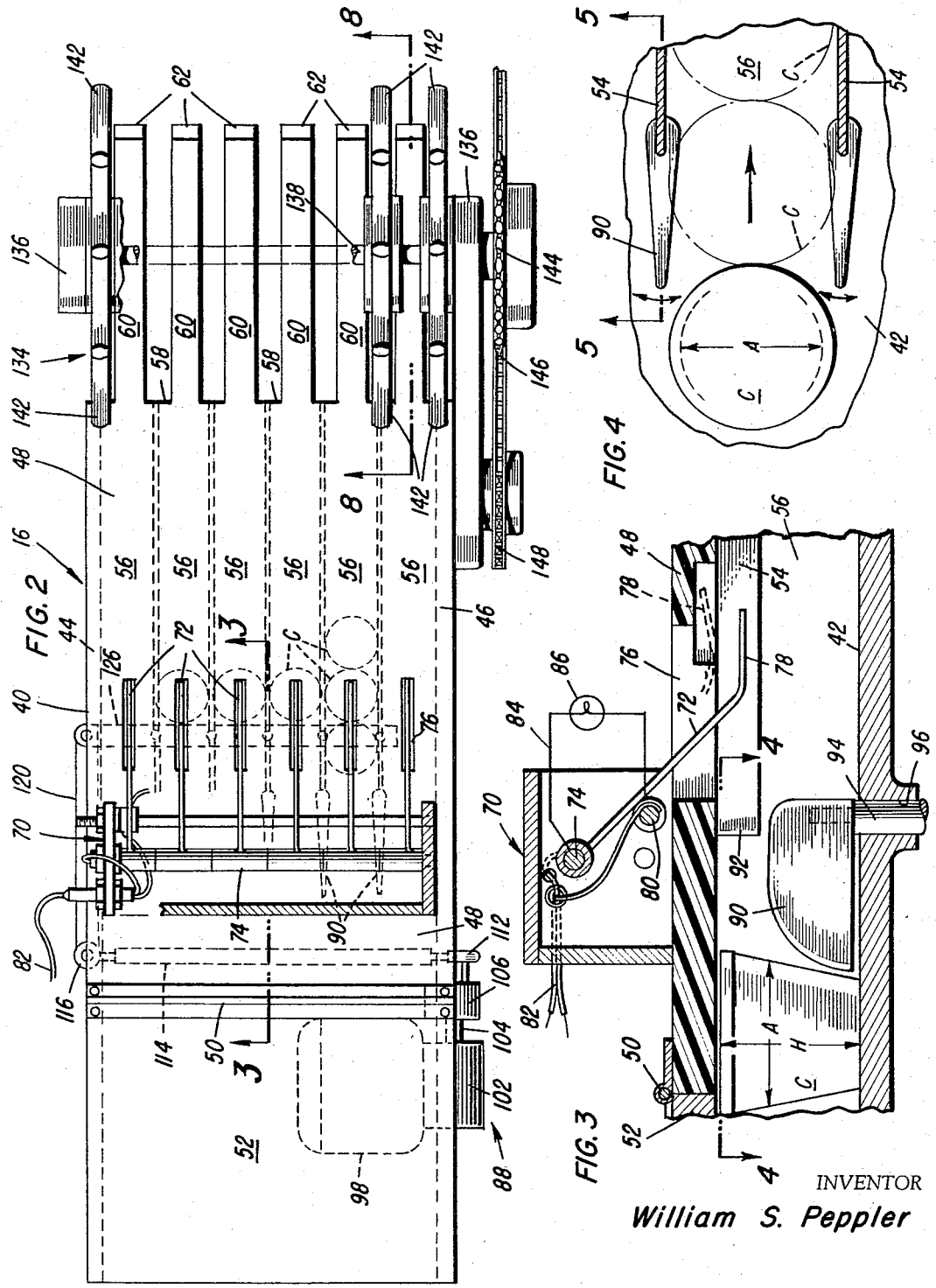

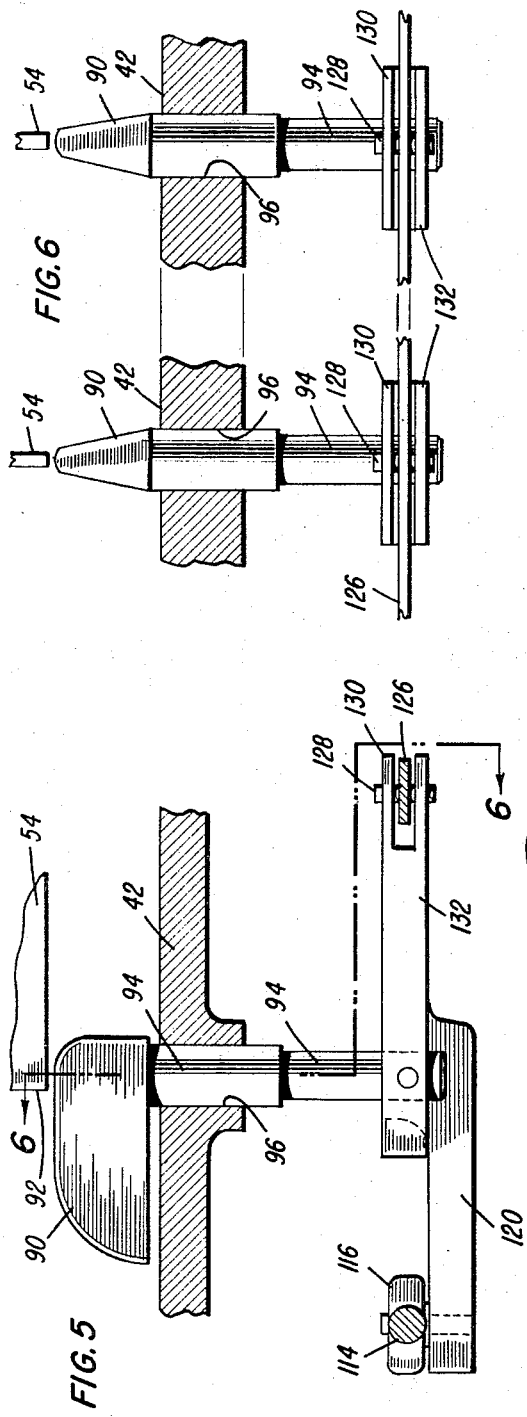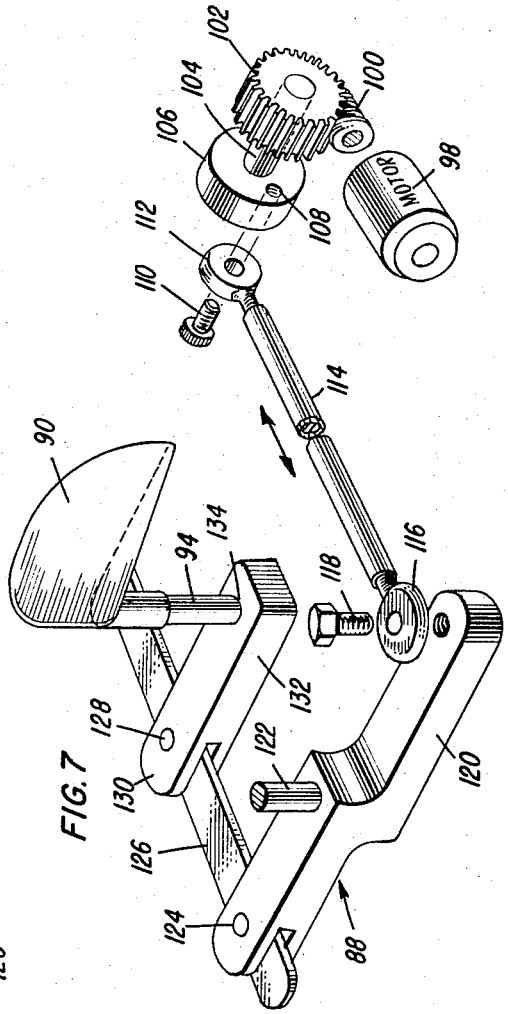

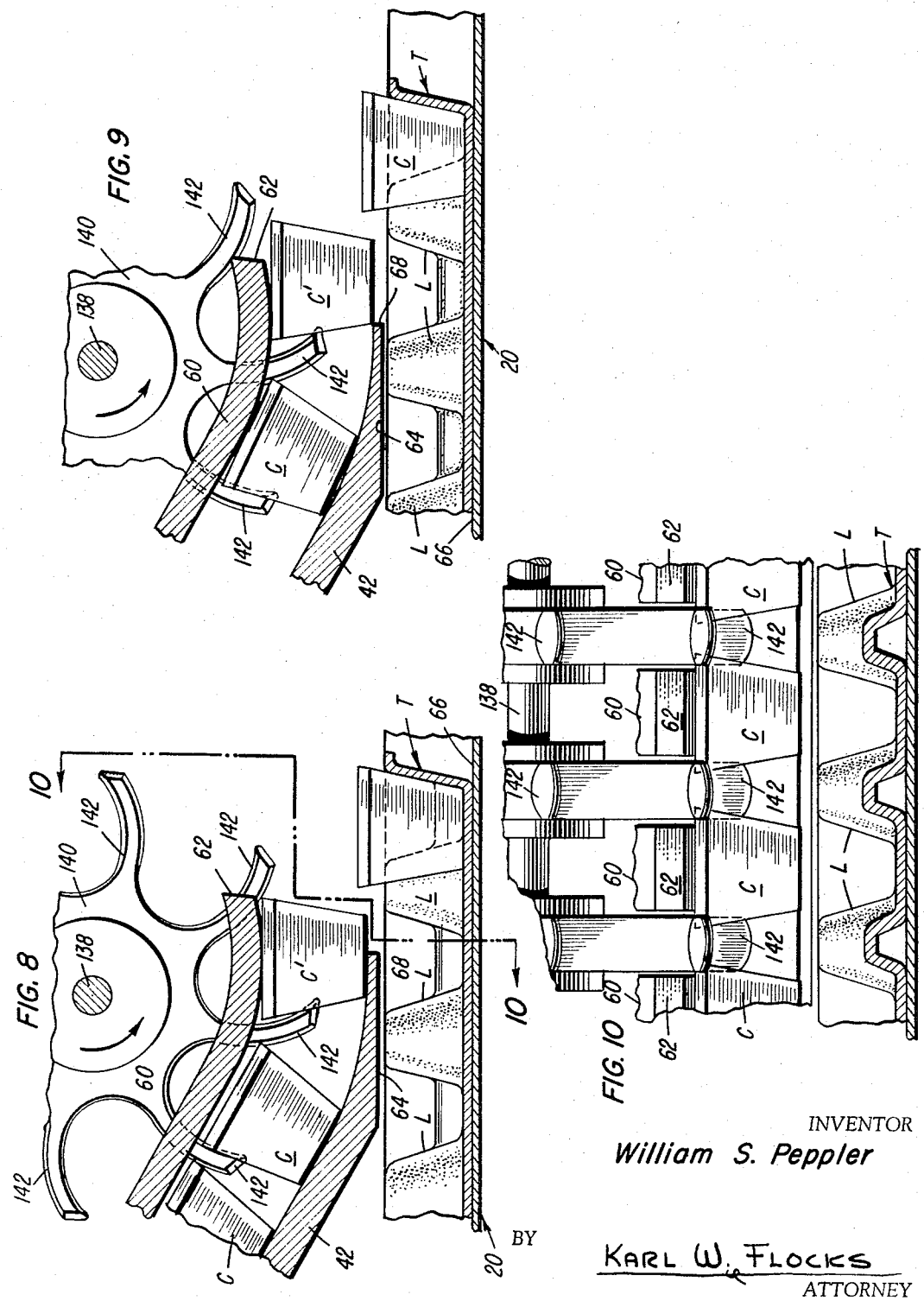

United States Patent Office 3,314,212
Patented Apr. 18, 1967

3,314,212
TRAY LOADING MACHINE
William S. Peppler, Chappaqua, N.Y., assignor to Diamond International Corporation, New York, N.Y., a corporation of Delaware
Filed Feb. 17, 1965, Ser. No. 433,436
5 Claims. (Cl. 53—55)

This invention relates generally to automatic loading equipment, and more particularly to apparatus for continuously receiving a random supply of small articles such as cups or the like and automatically loading them into cellular trays.

This application is a continuation-in-part of applicant's copending application entitled, Tray Loading Machine, Ser. No. 355,179, filed Mar. 27, 1964.

A primary object of the present invention is to provide loading apparatus for depositing a plurality of cup-like articles in a cellular packaging tray.

Another object of the present invention is to provide novel tray loading apparatus functioning in cooperation with a cellular tray denester and stacker.

A still further object of the present invention is to provide novel tray loading apparatus in which an inclined hopper receives a plurality of randomly oriented articles, includes means for orienting the articles into parallel rows, includes means for continuously moving transverse rows of articles and depositing them into a cooperating row of transverse cellular compartments in the tray.

Other and more specific objects of the present invention become apparent from a consideration of the following description when taken in conjunction with the accompanying drawings forming a part thereof, wherein:

FIG. 2 is an enlarged fragmentary plan view looking substantially from the plane of line 2—2 of FIG. 1;

FIG. 3 is an enlarged fragmentary section taken substantially on the plane of line 3—3 of FIG. 2;

FIG. 4 is a fragmentary plan view taken substantially on the plane of line 4—4 of FIG. 3;

FIG. 5 is an enlarged vertical section taken substantially on the plane of line 5—5 of FIG. 4;

FIG. 6 is a section taken substantially on the plane of line 6—6 of FIG. 5;

FIG. 7 is a fragmentary, exploded perspective view of the shuffling mechanism removed from the apparatus;

FIG. 8 is a fragmentary section taken substantially on the plane of line 8—8 of FIG. 2;

FIG. 9 is a fragmentary view similar to FIG. 8 showing the manner in which the articles are deposited into the compartments of a packaging tray; and FIG. 10 is a fragmentary elevation taken substantially on the plane of line 10—10 of FIG. 8.

Figure 1:
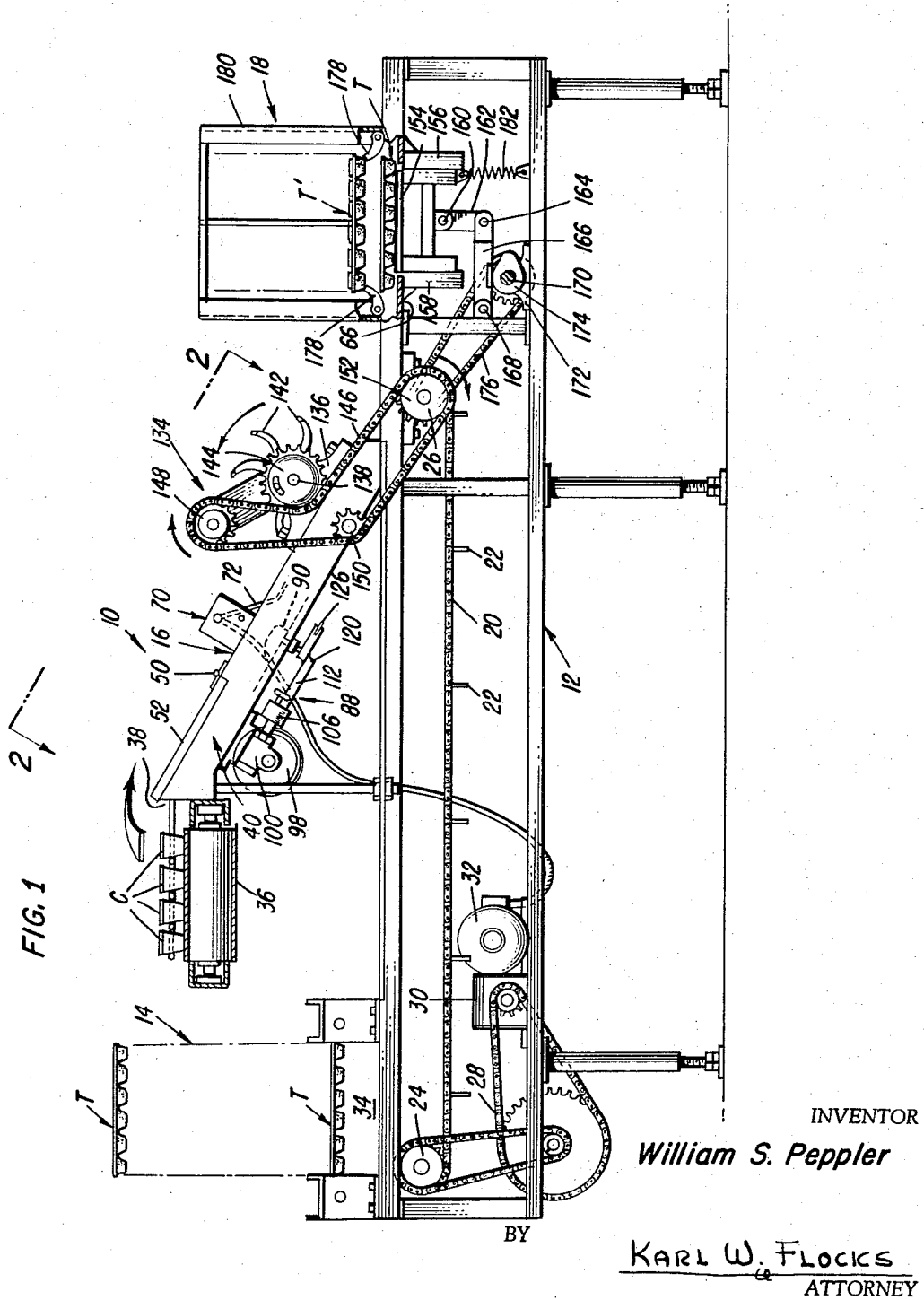
FIG. 1 is a side elevation of the apparatus with portions broken away and shown in section.

Referring to FIG. 1, the tray loading machine is indicated generally at 10 and comprises a support frame 12 having mounted thereon denesting apparatus indicated generally at 14, a cup-orienting assembly indicated generally at 16, and a loaded-tray stacking assembly indicated generally at 18.

The support frame has mounted thereon an endless conveyor including a plurality of spaced outwardly extending abutment elements 22. The conveyor 20 is entrained over roller elements 24 and 26 suitably journalled on the support frame and is driven by a drive belt 28 connected to a transmission 30 operated by a motor 32.

Generally overlying the trailing end of the conveyor 20 at 34 is a denester which will periodically deposit a lowermost compartmented tray T on the upper run of the conveyor 20 in timed relation to movement of the conveyor. The denester may be of any suitable character and specific details thereof will not be disclosed. However, denester may be of the character of that disclosed in application Ser. No. 355,179.

An upper, horizontally disposed conveyor 36 will receive thereon a plurality of cups C filled with cream, jelly, etc. and the cups move in random oriented relationship to the entrance end 38 of the cup orienting assembly 16.

The cup orienting assembly 16 includes an inclined hopper 40 having a bottom wall 42 and a pair of flanking side walls 44 and 46. Extending transversely between the side rails 44 and 46 is a cover plate 48, preferably transparent, which is spaced above the bottom wall a distance, i.e. substantially slightly greater than the height of the cup C (see FIG. 3). Hingedly connected at 50 to the upper end of the cover plate 48 is an access panel 52 which permits an operator to have access to the assembly in the event jams occur, etc. Depending in any suitable manner from the undersurface of the cover plate 48, in spaced mutually parallel relationship, is a plurality of track-forming elements 54 which form parallel tracks or rows 56 into which a row of cups or articles will be directed. Extending longitudinally at the lower end 58 of the cover plate 48, and disposed intermediately of the rows 56 formed by the rails 54, are hold-down strip elements 60 which have an upwardly turned lower end portion 62 (see FIGS. 8 and 9, for example).

As seen in FIGURES 8 and 9, the bottom 42 of the hopper includes a lower horizontal planar surface portion 64 disposed parallel to and overlying the upper run 66 of the conveyor 20. The lowermost transverse edge 68 of the bottom 42 is disposed inwardly or rearwardly of the terminal end of the strips 62, and this construction functions to maintain the cups in the upright condition indicated at C' for receipt in the cells L of the tray.

Indicated generally at 70 is a control assembly, similar to that disclosed in detail in application Ser. No. 355,179 which includes a plurality of sensing assemblies or feeler elements 72 journalled on a suitable support shaft 74 extending transversely in overlying relationship with respect to the cover plate 48. The triggers extend through elongated slots 76 formed in the cover plates, it being noted that the slots 76 overlie an intermediate portion of the tracks 56. The sensing elements 72 include a lower portion 78 disposed in the path of travel of the cups C as they move through the tracks 56 and when a cup C is disposed in a track 56, the portion 78 will be disposed in the dotted line position shown in FIG. 3. Indicated at 80 is a contact element for closing an electrical circuit 82 (not shown in detail) operatively connected to suitable means for controlling operation of the motor 32. Control circuit 82 will be effective to prevent operation of the conveyor 20 and trays T will not be conveyed beneath the lower end of the cup orienting assembly until each of the tracks 56 is filled with a sufficient number of cups to fill the compartments L of the trays passing therebeneath. A suitable signal circuit 84 may be connected between shaft 74 and contact 80 to energize signal means 86, i.e. light, buzzer, etc., to indicate to an operator of the apparatus that one of the tracks 56 does not contain a sufficient number of cups.

Indicated generally at 88 is a cup or article shuffling assembly for the purpose of aligning or directing the articles into the tracks 56. The shuffling assembly 88 comprises a plurality of oscillatable, tapered abutment elements 90, which underlie the upper end 92 of the rib or guide elements 54 (see FIGS. 3 and 4) and elements 90 are connected to support shafts 94 extending through aperture portions 96 formed in the bottom wall 42 of the hopper. The shuffling assembly 88 includes a motor 98 connected to a worm gear 100 meshed with a driven pinion 102. The pinion 102 is mounted on a shaft 104 to which is connected a plate 106 having an eccentrically disposed bore portion 108. Connected to the plate 106 by means of a suitable fastener 110 is one apertured end 112 of a force transmitting rod 114, the other apertured end 116 of which is connected by means of a fastener 118 to a lever or link element 120. The link element 120 is pivotally connected on a shaft 122 to the bottom 42 of the hopper. Pivotally connected at 124 is a relatively flat elongated link element 126 which extends transversely beneath the entire width of the bottom 42 of the hopper. Pivotally connected at 128 in spaced relationship along the link element is the bifurcated ends 130 of lever elements 132 which have secured thereto, as indicated at 133, the lower ends of the shafts 94 of the elements 90.

Operation of the motor 98 will cause reciprocation of the force transmitting rod 114, accordingly causing oscillation of the elements 90 as indicated by the dotted arcuate direction arrows on FIG. 4. This shuffling or oscillating movement of the elements 90 will serve to orient the cups C into the tracks 56 where they will progress due to gravity to the lower portion of the hopper and be guided and maintained in the tracks by the rib elements 54.

The cup or article orienting assembly 16 includes thereon mechanically operated abutment means indicated generally at 134 and comprising suitable bearings 136 upon which a transverse support shaft 138 is mounted. The shaft 138 has suitably secured therealong to a plurality of transversely spaced abutment finger plates 140, each of which includes radially projecting abutment fingers 142 which depend between adjacent margins of the guide strips 60 (see FIG. 10). It will be noted that the cups C taper downwardly (note dimension A) from their upper edge, accordingly providing a space between. The terminal ends of the fingers 142 will engage behind an intermediate portion of the cups C (see FIG. 8) and move it forwardly beyond the edge 68 of the bottom 42 of the hopper while the portion 62 of the guide strips 60, which extend forwardly of the edge 68 of the bottom 42, serve to maintain the cups in the position shown in FIG. 9, and the cups move over the edge 68 in an upright condition and drop into the receptacles or compartments L of the trays T.

The shaft 138 includes on the terminal end thereof a sprocket 144 which is meshed with a timing or drive chain 146 entrained over a toothed idler wheel 148 and 150. The chain is connected to a toothed wheel 152 rotating in unison with the support roller 26 of the conveyor 20.

The stacker assembly 18 includes a horizontal platform 154 reciprocably supported in guide tracks 156 and 158 and the upper surface of the platform is normally disposed in substantially coplanar relationship with the upper run 66 of the conveyor 20. The platform 154 is pivotally connected at 160 to a link 162 which is pivotally connected at 164 to a lever 166 which in turn is pivotally connected at 168 on the support frame. A support shaft 170 is suitably journalled at 172 on the frame 12 and has fixed thereto an abutment element 174 in coplanar alignment with the lever 166. An endless flexible driving belt 176 is operatively connected to the shaft 170 and a magnetic clutch (not shown) is periodically energized to cause the camming element 174 of a tate with the shaft 170 to urge the platform 154 upwardly and beyond a pair of pivotal latch elements 178 of a tray-receiving hopper 180. The platform 154 is connected to a tension spring 182 anchored on the frame 12 to cause it to return to the normal position shown in FIG. 1.

As compartmented or cellular trays T move into overlying relationship with respect to the platform 154, a suitable sensing means (not shown) for causing rotation of the camming element 174 functions to urge the trays to the position T', i.e. above the latch elements 178, and in this manner trays filled with cups of jelly, cream, etc. are stacked after having been filled.

*Operation of the apparatus*

The conveyor 36 receives thereon cups C which have been filled with jelly, cream, etc. The cups are guided into the hopper 16 and are oscillated into rows by means of the (shuffling or abutment) elements 90. Until each of the tracks 56 are filled with cups, the sensing assemblies 70 will deactivate the conveyor 20. After each of the rows 56 are filled, i.e. downwardly below the sensing elements or levers 72, the circuit to the motor 32 will be closed, and the conveyor 20 can operate. Trays progressively moved from left to right when considering FIG. 1, and trays automatically denested from the denesting apparatus or assembly 14.

The mechanically operated abutment assembly 134 will be rotated in timed relationship with the conveyor 20 engaging the transverse row of cups disposed at the lower end of the hopper and these cups will be urged over the lower edge 68 of the bottom 42 of the hopper and dropped into the recesses or cells L of the trays T.

In this manner, the trays T are continuously and automatically filled with cups C and after this occurs, filled trays are stacked in the stacker assembly 18.

It will be obvious to those skilled in the art that various changes may be made without departing from the scope of the invention and therefore the invention is not limited to what is shown in the drawings and described in the specification but only as indicated in the appended claims.

What is claimed is:

1. In a tray loading apparatus for automatically receiving, orienting and depositing articles in compartmented trays, comprising, in combination, inclined hopper means, said hopper means including a planar bottom wall having a lower, terminal, transverse edge, a cover wall parallel to and overlying said bottom wall, guide elements depending from the undersurface of said cover wall and defining parallel magazine rows between said walls for maintaining and orienting articles in a row and maintaining the articles substantially normal to the general plane of said cover and bottom walls, said cover wall including a plurality of terminal hold-down strip elements having an under-surface parallel to said bottom wall and disposed intermediately of said parallel rows and having the terminal end forwardly of said transverse edge of said bottom wall; conveyor means disposed beneath and in intersecting relation with the lower end of said hopper means for supporting oriented trays thereon, said bottom wall having an under surface rearwardly of the transverse edge thereof parallel to said conveyor means mintaining the trays in oriented relationship; and mechanically-operated abutment means mounted on said inclined hopper means and including a support shaft disposed above and rearwardly of the lower end of said hopper means, said abutment means including a plurality of pairs of abutment fingers mounted on said shaft, one of each of said pairs of abutment fingers including a terminal end portion having an orbit of rotation extending into a side portion of the respective rows and flanking opposite and rearwardly of said hold-down strip elements for engaging an article disposed in the row and displacing it out over the transverse edge of said bottom wall while still engaged by the under-surface of said hold-down strip elements.

2. The structure as claimed in claim 1, including article sensing means on said cover wall, said cover wall including openings therein in alignment with said rows defined by said guide elements, said article sensing means including feeler portions extending into said openings in said cover wall and disposed upstream of said rows for sensing the presence of articles to completely fill said rows, said article sensing means including control means operatively connected to said conveyor means for controlling movement of said conveyor means in relation to a magazine row filled with articles and movement of trays disposed on said conveyor means.

3. The structure as claimed in claim 1, including article shuffling means disposed in said hopper between said bottom and cover walls, said article shuffling means comprising guide elements disposed upstream and in alignment with said depending guide elements for guiding randomly-disposed articles upstream downstream into said hopper means rows.

4. The structure as claimed in claim 1 in which said cover wall includes an access panel displaceably supported on said cover wall upstream of said guide elements for permitting access to the upper ends of said magazine rows.

5. The structure as claimed in claim 1, including a stacker assembly operatively connected to said conveyor means and disposed at the terminal end of said conveyor means, said stacker assembly comprising a support platform normally supported in coplanar relation with said conveyor means for receiving filled trays therefrom, said stacker assembly including a vertically disposed, tray-receiving hopper overlying said support platform, one-way latch means at the bottom of said tray-receiving hopper for permitting filled trays to move upwardly therein and preventing downward movement thereout, and power controlled means operatively connected to said support platform for periodically raising a tray into said receiving hopper and past said latch means for depositing filled trays in said receiving hopper from the lower end thereof.

References Cited by the Examiner
UNITED STATES PATENTS

| | | | |
|---|---|---|---|
| 2,219,827 | 10/1940 | Kimball et al. | 53—166 X |
| 2,699,278 | 1/1955 | Wysocki | 53—160 |
| 2,855,740 | 10/1958 | Noland et al. | 53—160 X |
| 3,225,512 | 12/1965 | Bulger et al. | 53—62 X |

TRAVIS S. McGEHEE, *Primary Examiner.*